United States Patent
Haskins

(10) Patent No.: US 9,527,576 B2
(45) Date of Patent: Dec. 27, 2016

(54) METHOD AND ASSEMBLY FOR ATTACHING FUEL SYSTEM COMPONENTS TO A RIB BEFORE THE ASSEMBLY IS JOINED TO AN AIRCRAFT WING

(71) Applicant: AIRBUS OPERATIONS LIMITED, Bristol (GB)

(72) Inventor: Richard Haskins, Bristol (GB)

(73) Assignee: Airbus Operations Limited, Bristol (GB)

( * ) Notice: Subject to any disclaimer, the term of this patent is extended or adjusted under 35 U.S.C. 154(b) by 211 days.

(21) Appl. No.: 13/961,199

(22) Filed: Aug. 7, 2013

(65) Prior Publication Data

US 2014/0048651 A1 Feb. 20, 2014

(30) Foreign Application Priority Data

Aug. 15, 2012 (GB) .................... 1214575.1

(51) Int. Cl.
*B64C 3/18* (2006.01)
*B64C 3/34* (2006.01)
*B64D 37/06* (2006.01)

(52) U.S. Cl.
CPC ............. *B64C 3/187* (2013.01); *B64C 3/34* (2013.01); *B64D 37/06* (2013.01); *Y10T 29/49826* (2015.01)

(58) Field of Classification Search
CPC ............. B64C 3/34; B64C 3/18; B64C 3/187; B64C 3/182; B64C 3/185; B64D 37/06; B64D 2037/325; B64D 37/04
See application file for complete search history.

(56) References Cited

U.S. PATENT DOCUMENTS

| | | | | |
|---|---|---|---|---|
| 1,445,454 A | * | 2/1923 | Short ................... | B64C 3/00 244/123.9 |
| 2,392,818 A | * | 1/1946 | Grafman ............... | B64C 3/00 244/123.12 |
| 2,602,614 A | * | 7/1952 | Cole ..................... | B64D 37/04 169/57 |
| 2,938,680 A | * | 5/1960 | Greene .................. | B64C 9/22 244/210 |
| 4,481,703 A | * | 11/1984 | Scott ..................... | 29/525.06 |

(Continued)

FOREIGN PATENT DOCUMENTS

| | | |
|---|---|---|
| EP | 0 148 968 | 7/1985 |
| GB | 818144 | 8/1959 |
| WO | WO 2010/010382 | 1/2010 |

OTHER PUBLICATIONS

Merriam-Webster.com, definition of space, http://www.merriam-webster.com/dictionary/space, accessed Feb. 17, 2016.*

(Continued)

*Primary Examiner* — Tien Dinh
*Assistant Examiner* — Alexander V Giczy
(74) *Attorney, Agent, or Firm* — Nixon & Vanderhye P.C.

(57) ABSTRACT

A method of installing fuel system components in an aircraft wing in which the fuel system components are attached to ribs before the ribs are assembled into the wing. The ribs are structural ribs for the wing and may be assembled to form a combined rib and fuel system component assembly before the assembly is added to the wing.

13 Claims, 2 Drawing Sheets

(56) References Cited

U.S. PATENT DOCUMENTS

| | | | | |
|---|---|---|---|---|
| 4,739,954 | A | * | 4/1988 | Hamilton .................. B64C 3/26 244/123.1 |
| 5,138,559 | A | * | 8/1992 | Kuehl et al. .................... 702/55 |
| 6,868,314 | B1 | * | 3/2005 | Frink ................................ 701/3 |
| 8,172,179 | B2 | * | 5/2012 | Crawford .................. 244/123.7 |
| 8,967,529 | B1 | * | 3/2015 | Bennett .................. B64D 27/24 244/53 R |
| 2007/0029446 | A1 | * | 2/2007 | Mosher et al. ............ 244/158.1 |
| 2011/0284687 | A1 | * | 11/2011 | Parker .......................... 244/99.5 |
| 2012/0103685 | A1 | | 5/2012 | Blanchard et al. |
| 2012/0132755 | A1 | | 5/2012 | Petit et al. |
| 2012/0235815 | A1 | * | 9/2012 | Coveley et al. ........... 340/545.6 |
| 2013/0319727 | A1 | * | 12/2013 | Wen et al. ............... 174/117 FF |

OTHER PUBLICATIONS

Google.com, "corresponding" definition; https://www.google.com/search?q=corresponding&sourceid=ie7&rls=com.microsoft:en-US:IE-Address&ie=&oe=&gws_rd=ssl; accessed Jul. 28, 2016.*
Search Report for GB 1214575.1 dated Dec. 5, 2012.
Search Report for GB 1214575.1 dated May 7, 2013.

* cited by examiner

METHOD AND ASSEMBLY FOR ATTACHING FUEL SYSTEM COMPONENTS TO A RIB BEFORE THE ASSEMBLY IS JOINED TO AN AIRCRAFT WING

This application and claims priority to GB 1214575.1 filed 15 Aug. 2012, the entire contents of each of which are hereby incorporated by reference.

TECHNICAL FIELD

The invention relates to a rib for an aircraft wing and to a method of assembling an aircraft wing comprising the rib.

BACKGROUND TO THE INVENTION

An aircraft wing is constructed from a plurality of spaced ribs that are joined by spars which run along the length of the wing and attach to the fuselage. Stringers are joined to the outer surfaces of the ribs to support the outer skin of the wing.

The space within an aircraft's wing, between the ribs and within the skin, is utilised to store aviation fuel. The fuel is sealed within the skin of the wing and may pass through openings in the structural members of the wings, such as the ribs and spars. A wing used to store fuel will also have a fuel system having the necessary components for monitoring and handling the fuel. Such components may include pumps, valves and sensors as well as other equipment to monitor and control the fuel. Some ribs have openings in them to allow fuel to move through the ribs, however, other ribs may be sealed to create separate fuel storage areas within the wing. Typically, sensors are positioned on ribs to gauge the amount of fuel remaining in that storage area.

Currently, fuel system components are installed into the wing during the final wing manufacturing process after the skins, ribs, spars and stringers are fixed together. This installation process is problematic because once the wing is fully, or even partly assembled, access to the fuel storage areas is inhibited and the installation work is labour intensive which may reduce the quality of installation and therefore the reliability of the fuel system.

Furthermore, cables and pipes for connecting the fuel system have to take indirect or arduous paths through the wing, sometimes including a path through a penetration in the wing skin and over outer surfaces of the aircraft, such as for electrical boost pumps. The cables may be exposed to damage from foreign objects within the fuel storage areas, within the wing and outside of the aircraft. Moreover, cable harnesses on outer surfaces of an aircraft can cause undesirable aerodynamic effects.

To install the components within the wing, the connecting cables may need to be deformed around bends and within the confined spaces of the wing. This may cause damage to the components and cables during installation.

Similar problems will recur throughout the life of the fuel system during maintenance and repair. Access will remain difficult and parts of the wing may need to be disassembled to replace components.

SUMMARY OF THE INVENTION

According to the invention, there is provided a method of installing fuel system components in an aircraft wing comprising a plurality of structural elements such as ribs which are joined together during assembly of the wing, the method including the step of attaching at least some fuel system components to at least one of said structural elements prior to joining said structural elements together to assemble a wing.

Attaching fuel system components to a structural element prior to wing assembly will reduce the assembly time and effort required during wing assembly. This is desirable because the wing assembly process is complex and costly. Furthermore, installing the components prior to wing assembly improves access to the structural elements allowing the components to be installed with improved accuracy and quality.

The step of attaching at least some fuel system components to at least one of said structural elements may comprise the step of attaching them to an outer surface of a structural element prior to joining said structural elements together to assemble a wing.

The structural elements may be ribs each having walls that separate the interior of the wing into separate compartments and the method may include the step of attaching components to said walls prior to joining said structural elements together to assemble a wing.

The structural elements may be ribs, at least one rib being formed from a pair of rib portions each having walls, said rib portions being configured such that a space is formed between said walls of each rib portion and the method may include the step of attaching the components to said walls in said space between the rib portions.

Attaching fuel system components in a space between two portions of a rib will provide protection for more damage prone components such as fibre optic sensors.

The method may include the step of attaching fuel system components to the first rib portion before attaching the second rib portion to the first rib portion.

The fuel system components may be electrical components, said structural elements may include a channel or conduit for the passage of cables and/or fuel pipes therethrough and the method may include the step of routing said cables and/or fuel pipes through said channels or conduits prior to joining said ribs together to assemble a wing.

According to another aspect of the invention, there is provided a structural rib for an aircraft wing comprising first and second portions each having a wall that defines a space between said rib portions when said rib portions are attached to each other, said space being configured to receive one or more fuel system components mounted to one or both of said walls prior to attachment of the rib portions to each other.

The rib may include a channel or conduit for the passage of cables and/or fuel pipes out of said space between said rib portions.

The structural rib may comprise first and second portions each having a wall that defines a space between said rib portions when said rib portions are attached to each other, and one or more fuel system components such as sensors, pumps and/or valves mounted to at least one wall in said space between the rib portions.

According to another aspect of the invention, there is provided an aircraft wing comprising a plurality of structural rib and fuel system assemblies, as described above, joined to each other in spaced relation.

BRIEF DESCRIPTION OF THE DRAWINGS

Embodiments of the invention will now be described, by way of example only, with reference to FIGS. 1 to 3 of the accompanying drawings, in which.

DETAILED DESCRIPTION

Figure 1:
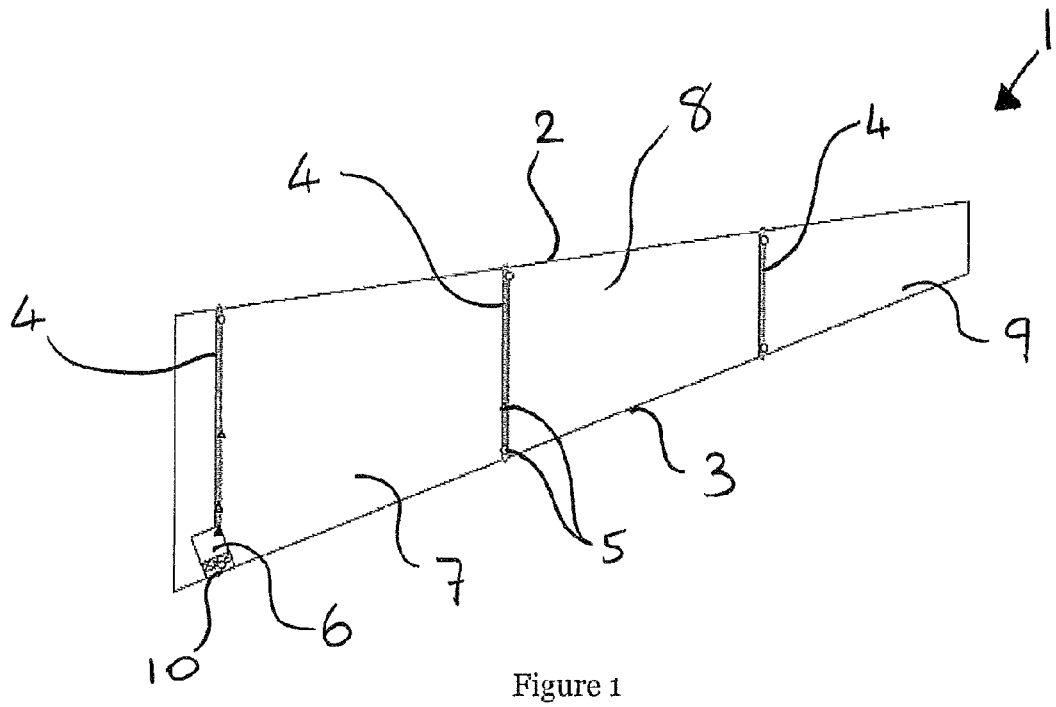
FIG. 1 shows a schematic cross-sectional front view of an aircraft wing showing several ribs.

FIG. 1 shows a schematic cross-sectional front view of an aircraft wing 1. The top skin 2 and bottom skin 3 of the wing are shown and the locations of three ribs 4 are indicated. Fuel is sealed within the skin 2, 3 of the wing and the ribs 4 may be sealed to separate different fuel storage areas 7, 8, 9 within the wing 1. Alternatively, the ribs 4 may have openings through which fuel can move within the wing 1. The indicated ribs 4 are gauging ribs, with sensors mounted to them to measure the amount of fuel remaining in the wing. The wing 1 may have further intermediate ribs (not shown) between the gauging ribs shown in FIG. 1. Other fuel system components, such as pumps, are also located in the wing for handling fuel stored in the wing.

An aircraft fuel system comprises pumps 6, valves 10 and sensors 5 to move fuel from the storage areas 7, 8, 9 to the aircraft engines (not shown) and to detect and monitor different parameters of the fuel, such as temperature and pressure. Valves may be provided to control movement of fuel between the fuel storage areas 7, 8, 9. Water drain valves 10 may be provided to allow water (or fuel) to be drained from the bottom of the storage areas, out of the wing 1. Sensors 5 may be provided to determine the amount of fuel remaining in the storage area. Pressure sensors may be mounted at the top and bottom of each rib to determine the pressure difference between the ullage pressure (pressure of gas and vapour at top of storage area) and the fuel bulk pressure (pressure within fluid). Alternatively or additionally, sensors that detect the level of fuel in the storage areas may be provided. Also, temperature sensors may be used to monitor the temperature of the fuel to identify freezing or overheating problems. It will be appreciated that any other sensors may be installed to detect any parameters that might be of interest or concern.

As previously explained, installation of the fuel system equipment during or after final wing construction is problematic because of the difficulty in gaining access to the interior of the wing where the components should be installed. Positioning components and feeding cables along the wing, through openings in the ribs can be complicated when the structure is rigidly assembled. This may result in a labour intensive assembly process and poorly installed and/or damaged components or cables.

Figure 2:
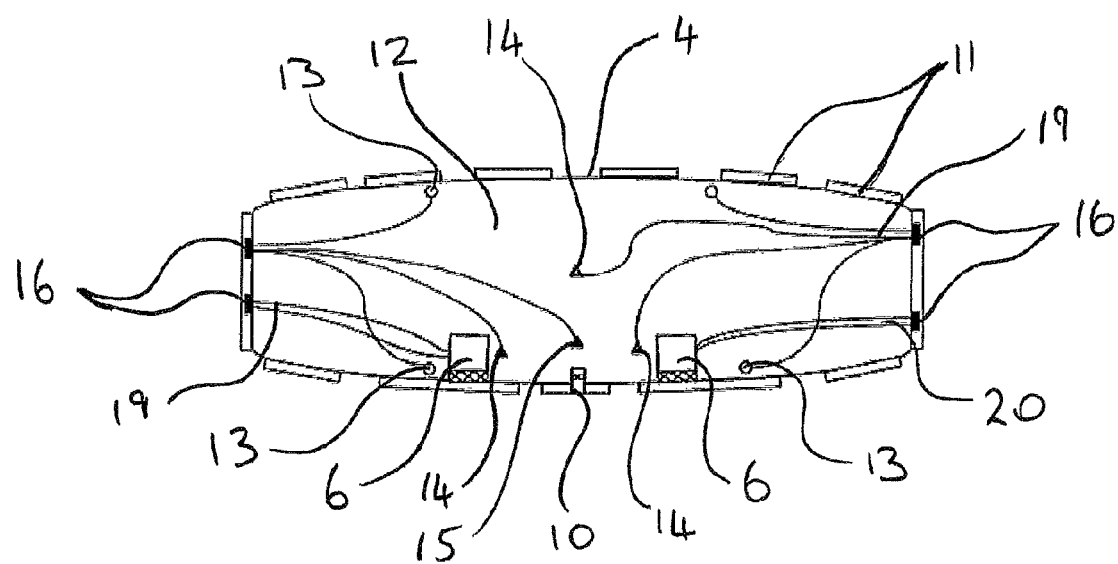
FIG. 2 shows a side view of a rib according to an embodiment of the invention for the aircraft wing of FIG. 1; and, FIG. 3 shows a bottom view of a rib according to another embodiment of the invention.
Figure 3:
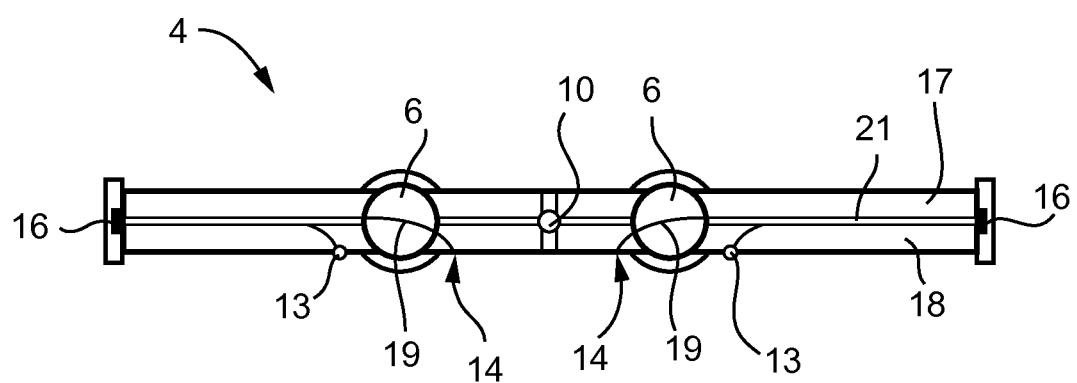

To overcome the problems associated with installation of the fuel system to an already assembled or partly assembled wing, the ribs 4 of FIG. 1 are fitted with the fuel system components prior to final assembly of the wing. FIGS. 2 and 3 show different embodiments of ribs 4, onto which the fuel system components are installed prior to that rib 4 being installed into the wing.

Installation of the fuel system components, such as sensors, pumps and valves, is easier to carry out prior to assembly of the wing than during the final wing assembly, when access becomes more arduous. Pumps and valves are mounted directly to the rib which simplifies the final assembly operation, when only the rib needs to be installed into the wing and the cables suitably connected. The components are protectively covered during wing assembly to prevent damage.

Once the wing is assembled, with the components already mounted on the ribs, the cables which protrude from the rib need to be connected to the relevant connectors on the controller and power source and the equipment may be tested and calibrated. This reduces the time and effort required on the final assembly line and provides an opportunity to get a sub-contractor to perform the component installation which may reduce costs. Furthermore, pre-installing the equipment to the rib greatly simplifies and eases the installation of the connecting cables to the rib because the installation operator will have full, unimpeded access to the rib. Also, to simplify the final connecting process, cables can be harnessed together with a single connector provided for each rib, for example, a connector may be provided in the tank wall at the end of the rib. In this way, when the wing is assembled, each of the connectors would be aligned and a conduit can easily carry the cables along the wing to the fuselage.

Different embodiments the gauging ribs 4 that are preinstalled with fuel system components will now be described with reference to FIG. 2 and FIG. 3.

FIG. 2 shows a side view of a first embodiment of a gauging rib 4 for a wing 1. The stringers ii shown around the outer surface of the rib 4 provide the mounting points for the top and bottom skins 2, 3 (see FIG. 1) of the aircraft wing 1. The rib 4 shown is a sealed gauging rib, although openings may be provided through the main body 12 of the rib 4 to allow fuel to move through the rib. The fuel system is installed on the rib and is configured to monitor the fuel and supply fuel to the aircraft engines. Once the rib is installed in the wing, the fuel system components are connected to a controller (not shown) that may be located in the main fuselage of the aircraft, therefore requiring connecting cables 19 along the wing to the fuselage.

In this embodiment, the pressure, temperature and fuel level sensors are mounted to an outer surface of the rib 4 and configured to determine and monitor conditions within the fuel storage area. These electrical components are mounted to an outer surface of the rib by fasteners, adhesive bonding or any other suitable method. A drain valve 10 is provided at a lower point of the fuel storage area to allow water and/or fuel to be drained from the fuel storage area. The valve may be automatic, electrically or manually operated.

The cables 19 extend along the aircraft wing through the ribs to connect the sensors 13, 14, 15 and pumps 6 to the controller and power source which may be located in the aircraft fuselage. If the valve 10 is electronically actuated, it may also be connected to the controller and/or power source, although this is not shown in FIG. 2. Some components, such as the pumps 6 and valves 10, may require inlet and/or outlet pipes 20 for carrying fuel, hydraulic fluid or compressed air. Conduits 16 are provided at each end of the rib 4 along which the cables 19 and pipes 20 are grouped in harnesses and extend along the wing. This simplifies the cable management and the cables of each assembled gauging rib in the wing are aligned so that the cable harnesses can extend directly towards the aircraft fuselage, within the wing.

The rib 4 shown in FIG. 2, with the fuel system components installed prior to assembly of the final wing, simplifies the assembly process and allows the sensors 13, 14, 15 to be accurately positioned and the cables 19 to be attached in a more controlled manner. The cables will not need to be deformed around obstacles during installation and the operator who installs the cables will have unimpeded access to the different parts of the rib, so that the components are installed accurately.

FIG. 3 shows a bottom view of a further embodiment of a gauging rib 4 for installation into an aircraft wing. In this embodiment, the rib 4 is formed from two portions 17, 18 that are attachable to each other and define a space 21 therebetween. The cables 19 connecting the sensors 13, 14, pumps 6 and possibly the valve 10 to the controller (not shown) are positioned in the space 21 between the two portions 17, 18 of the rib 4 prior to installation of the rib 4 into the wing. The space 21 is directly connected with conduits 16 at each end of the rib 4, thereby allowing cables 19 and/or pipes 20 (see FIG. 2) to pass directly from the space 21 between the portions 17, 18 of the rib 4 into the conduit 16 and along the wing. The two portions 17, 18 of the rib 4 may be attachable by fasteners, adhesives, welding or any other suitable method, mostly depending on the material the ribs are made from.

During assembly of the rib 4 of FIG. 3, the electrical components may be attached to one or both portions 17, 18 of the rib 4 prior to those portions being attached together to form the complete rib 4. Therefore, the components are fully attached and some are embedded within the rib 4 prior to installation of the rib 4 into the wing. The sensors 13, 14, 15, pumps 6, valves 10, cables 19 and pipes 20 can be attached by fasteners, adhesive bonding or any other attachment means. Positioning the cables 19 in the space 21 between the two portions 17, 18 of the rib 4 provides increased protection throughout the assembly and operational lifetime of the rib 4. Furthermore, the cable routes are direct and without any obstacles or potentially damaging tight radius bends.

The arrangement shown in FIG. 3 provides protection for the components of the fuel system and the cables 19 and pipes 20 as well as preventing operational damage to the cables 19 caused by foreign objects.

In the embodiments shown in FIG. 2 and FIG. 3, the pumps 6 have a direct intake so are located at the lowest point of the fuel storage area to draw fuel from the storage area. The pumps 6 will have an outlet pipe 20 that carries pressurised fuel away from the pump 6 towards the aircraft engines. Other pump types may be used and they may have a remote intake and can therefore be located anywhere along the path from the fuel storage area to the aircraft engines. However, remote intake pumps may still be mounted directly to a rib in the wing.

Attaching the fuel system components directly to the ribs, as shown in FIGS. 2 and 3, also makes it easier to perform repair or replacement operations. The sensor locations and cable paths are known and can be designed to be easily accessible so that cables and sensors can be removed and changed. Cable harnesses can be disconnected and easily removed from the wing for repair or replacement.

The assembly method for the ribs and aircraft wing will now be briefly described to clarify the stages required to install components of the fuel system onto a rib prior to final assembly of a wing.
1. The ribs are manufactured, either in one or two parts.
2. The fuel system components are manufactured and/or procured.
3. The fuel system components are installed onto the ribs. Sensors, pumps, valves, cables and pipes are attached in the required positions and are protected for the wing assembly process, for example by installing a removable cover.
4. The ribs with preinstalled fuel system components are installed into the final wing assembly. The preinstalled ribs are delivered to the final assembly point of the wing and the wing is assembled.
5. Once the wing is assembled, or during the assembly process, the cables and pipes need to be fed into the conduits along the wing and suitably connected to a controller and power source.

The first and second stages of this process can happen prior to, and remote from, the final assembly place of the aircraft wing. Therefore, there is an opportunity to procure the services of a sub-contractor to assemble the ribs with the fuel system components and deliver them to the wing assembly location. This may save cost, time and complexity, as well as improve quality and reliability of the installed components.

As explained previously, it is typical to have several perforations of the wing skin for a variety of reasons, for example cable and/or pipe harnesses, valve outlets or fasteners may pass through the wing skin. Perforations in the wing skin cause stress concentrations and the skin thickness is typically increased to counteract this.

An advantage of mounting components directly to the ribs and providing conduits for connecting cables is that fewer components need to be mounted to the skin and fewer perforations are required through the skin. For example, the cable harnesses pass along or through the rib and along the conduits, instead of through the skin and over an outer surface of the aircraft. Also, the pumps and valves are mounted directly to the ribs instead of being fastened to the skin.

A further advantage of mounting the fuel system components directly to the ribs, or within the ribs, is that any increased stress caused by remaining perforations in the wing surface can be counteracted by the relative strength of the rib. Some skin perforations are unavoidable, for example valve outlets, but by mounting the components to the rib instead of the wing skin the components and associated apertures are aligned with the ribs and any increased stress is counteracted by the strength of the rib. This reduces the need to increase skin thickness or provide additional support within the wing structure.

Moreover, any objects on the outer surface of a wing, such as fastener heads or a cable harness will disrupt the aerodynamic performance of the wing and may increase drag or other undesirable effects. The conduit will allow the cable and/or pipe harnesses to pass along the interior of the wing, thereby eliminating any aerodynamic disadvantages.

Moreover, the simplified cable routing within the wings, avoiding tight bends and having unimpeded access during installation, makes it feasible to install and use fibre optic cables. The glass cores of fibre optic cables are vulnerable to fracture when subjected to tight radius bends and are vulnerable to fatigue wear if not properly fixed and are therefore susceptible to movement during operation. This makes them unsuitable for post-wing-assembly installation. However, the increased protection and simplified assembly process offered by the pre-installed rib assembly means that damage to fibre optic cables is less likely. Fibre optic cables are desirable for use in a fuel storage system because they do not carry an electric charge and therefore can not create a spark which might ignite the fuel if there is air present in the fuel storage area. Furthermore, optical sensors typically have high accuracy and reliability and can be used for any of the sensors in the fuel system. Optical level sensors, pressure sensors and/or temperature sensors could be used in the fuel system as well as height sensors, probes and/or control signals for pumps and actuators.

It will be appreciated that the above described embodiments of the invention refer to the fuel system equipment being mounted to an aircraft wing rib, however, it is also envisaged that the same may apply to any other structural component of a wing, such as a wing spar or stringer or even the wing surface, without deviating from the invention defined in the claims. In fact, the equipment may be mounted to any existing or additional structural element of the wing so long as the pumps, sensors and valves are located appropriately after assembly of the full wing. Furthermore, the rib and assembly method can be applied to a structural element within other fuel storage areas, such as a centre tank within the fuselage.

Furthermore, other types of equipment or components may also be mounted to a structural element of the wing prior to assembly of the wing to save time and improve the quality of assembly.

The invention claimed is:

1. A method of manufacturing an aircraft wing assembly comprising ribs and other structural elements, the method including:
attaching a fuel system component to at least one of the ribs to form at least one preinstalled rib, wherein the at least one rib includes a pair of rib portions and each rib portion includes a wall, wherein the preinstalled rib is formed by joining the walls together such that the fuel system component is between the walls, and wherein the rib portions each have a height corresponding to a thickness of the aircraft wing;
delivering the at least one preinstalled rib to a wing assembly location at which the other structural elements are located; and
assembling the at least one preinstalled rib and the other structural elements at said wing assembly location.

2. The method of claim 1, wherein the attachment of the fuel system component to at least one of ribs to form the at least one preinstalled rib, comprises attaching the fuel system component to at least one of the walls.

3. The method of claim 1, including attaching the fuel system component to one of the walls before the one of the walls is joined to another one of the walls of the rib portions.

4. The method of claim 1, wherein the fuel system component is an electrical component, and at least one of the pair of rib portions includes a channel or conduit for the passage of a cable or fuel pipe, and the method includes routing the cable or fuel pipe through the channel or conduit prior to joining the walls of the rib portions.

5. A preinstalled structural rib configured for delivery to an aircraft wing assembly location at which ribs and other structural elements of an aircraft wing assembly are located for the manufacture of an aircraft wing assembly using said preinstalled structural rib, the ribs and the other structural elements, wherein the preinstalled structural rib comprises:
a pair of rib portions each having a wall, the wall of one of the rib portions facing and being attached to the wall of the other rib portion, wherein the rib portions each have a height corresponding to a thickness of the aircraft wing assembly;
a space between the rib portions; and
a fuel system component mounted to at least one of the walls and in the space between the rib portions.

6. An aircraft wing comprising a plurality of the preinstalled structural ribs according to claim 5, wherein the preinstalled structural ribs are joined to each other in spaced relation with the other structural elements.

7. A method of manufacturing an aircraft wing assembly comprising a preinstalled rib, ribs and other structural elements, the method comprising:
attaching a fuel system component to a wall of a rib portion of a pair of rib portions, wherein each of the rib portions has a height corresponding to a thickness of the aircraft wing assembly;
after attaching the fuel system component, forming the preinstalled rib by joining together the pair of rib portions wherein the wall faces a corresponding wall of another rib portion of the pair of rib portions;
delivering the preinstalled rib to a wing assembly location at which the ribs and the other structural elements are located; and
assembling the preinstalled rib with the ribs and the other structural elements at the wing assembly location.

8. The method of claim 7 wherein the attachment of the fuel system component to the wall is performed to position the fuel system component in an enclosed space formed between the walls of the rib portions when the rib portions are joined.

9. A method for manufacture of an aircraft wing assembly comprising:
forming a preinstalled rib by joining walls of a pair of rib portions with a fuel system component between the walls, such that the pair of rib portions and the fuel system component form the preinstalled rib, wherein the rib portions each have a height corresponding to a thickness of the aircraft wing assembly;
delivering the preinstalled rib to a wing assembly location at which other structural elements of the aircraft wing assembly are located; and
assembling the preinstalled rib and the other structural elements at said wing assembly location.

10. The method of claim 9 wherein the assembling step further includes assembling an additional rib.

11. The method of claim 9 wherein the attaching step includes forming a plurality of preinstalled ribs by attaching additional fuel system components to additional ribs.

12. The method of claim 11 wherein the preinstalled ribs constitute all ribs in the aircraft wing assembly and the other structural elements do not include ribs.

13. The method of claim 9 wherein the aircraft wing assembly is a portion of a wing of an aircraft.

* * * * *